United States Patent
Suzuki

(10) Patent No.: US 7,215,814 B2
(45) Date of Patent: May 8, 2007

(54) IMAGE FORMING APPARATUS PERFORMING IMAGE CORRECTION FOR OBJECT, AND METHOD THEREOF

(75) Inventor: Yuusuke Suzuki, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 846 days.

(21) Appl. No.: 10/310,955

(22) Filed: Dec. 6, 2002

(65) Prior Publication Data

US 2004/0109181 A1 Jun. 10, 2004

(51) Int. Cl.
- G06K 9/00 (2006.01)
- G06K 9/40 (2006.01)
- G03F 3/08 (2006.01)

(52) U.S. Cl. .................. 382/167; 382/274; 358/518
(58) Field of Classification Search ................ 382/162, 382/167, 274; 358/1.9, 3.06, 3.26, 3.27, 358/500, 518, 523

See application file for complete search history.

(56) References Cited

U.S. PATENT DOCUMENTS 5,832,126 A * 11/1998 Tanaka ...................... 382/239

2001/0019427 A1 * 9/2001 Komatsu .................... 358/1.18

FOREIGN PATENT DOCUMENTS

| JP | 9-193477 | 7/1997 |
|----|----------|--------|
| JP | 9-200549 | 7/1997 |
| JP | 10-200772 | 7/1998 |
| JP | 2000-331147 | 11/2000 |
| JP | 2001-69360 | 3/2001 |

* cited by examiner

Primary Examiner—Vikkram Bali
Assistant Examiner—Colin LaRose
(74) Attorney, Agent, or Firm—Foley & Lardner LLP

(57) ABSTRACT

An image forming apparatus comprises an identifying section configured to analyze image information and identify object information and detect the size of the object information and a concentration difference between the object information and the background information, an image processing section configured to perform image processing based on at least one of the size of the object information and a concentration difference relative to the background information, and a printer section configured to form an image based on image information on which the image processing is performed. By doing so, it is possible to effect proper image correction while giving consideration to a color "area" effect.

4 Claims, 7 Drawing Sheets

FIG. 5

| Drawing order | Object number | Size(pixel) | Adjacent object |
|---|---|---|---|
| 1 | (4) | 2400 | (3),(5) |
| 2 | (5) | 1200 | (3),(4) |
| 3 | (3) | 400 | (4),(5) |
| 4 | (2) | 100 | None |
| 5 | (1) | 80 | None |
| ... | | ... | ... |

FIG. 6

| Select condition | | | Drawing parameter | |
|---|---|---|---|---|
| Drawing object | | Adjacent object | | |
| Kind | Size(pixel) | | Color conversion table | Halftone cell |
| Text | Pixel number > 1000 | Halftone cell A | Color conversion table A | Halftone cell A |
| Text | Pixel number ≦ 1000 | Halftone cell B | Color conversion table B | Halftone cell B |
| ... | | ... | ... | ... |
| Graphic | Pixel number ≦ 1000 | None | Color conversion table B | Halftone cell B |

| Kind of object | Attribute | | | | |
|---|---|---|---|---|---|
| Image | Food | Cake (2) | Bean-jam filling bun (2) | Eel (3) | Mont Blanc (3) |
| | Animal | Dog (2) | Cat (2) | | |
| | Building structure | Building (3) | Tower (1) | | |
| Graphics | Pie-chart | Pie-chart (2) | | | |

FIG. 8

| Select condition | | Drawing parameter | |
|---|---|---|---|
| Drawing object | | Color conversion table | Halftone cell |
| Kind | Expression object | | |
| Image | Food | Color conversion table A | Halftone cell A |
| Image | Animal | Color conversion table B | Halftone cell B |
| Image | Building structure | Color conversion table C | Halftone cell C |
| Graphics | Pie-chart | Color conversion table D | Halftone cell D |

FIG. 9

IMAGE FORMING APPARATUS PERFORMING IMAGE CORRECTION FOR OBJECT, AND METHOD THEREOF

BACKGROUND OF THE INVENTION

Connectionally known in the image formation of a color printing system is a system for performing processing for each kind of drawing object by effecting a switching of color processing parameters of color-conversion color lock-up tables (hereinafter referred to as color conversion tables) and halftone cells on a threshold table used at the tone processing time. An expanded type of system is also proposed which, when a drawing object is an image, decides the kind of image with a command in a page description language (PDL) and, by doing so, performs processing by effecting a switching of color processing parameters.

As the examples of the prior art, there are Jpn. Pat. Appln. KOKAI Publication Nos. 2001-69360 and 2000-331147 and these disclose the technique for deciding the attribute of the drawing object in the color image processing method and performing color processing based on the result of decision.

When a human looks at an object, what is called a color "area" effect works. The color "area" effect means an effect by which the lightness and saturation of an object look different due to its color-drawn area. In the above-mentioned prior art technique, color correction while giving consideration to such a color "area" effect is not made and it is, therefore, not possible to obtain any adequate printing result. Thus a problem is involved. Even in the switching of halftone cells, such a switching is not effected in a way to give consideration to the relation of the halftones between the adjacent objects and, depending upon a combination of such halftones, there is a problem with which a printed thing looks unnatural sometimes.

Further, the kind of image is not specified in a way to make adequate use of image information to be printed and color conversion and tone correction are not made in a way to be matched to the kind of image. And any adequate color correction is not effected in a way to be matched to the kind of image, so that a problem is involved.

BRIEF SUMMARY OF THE INVENTION

The project of the present invention is to provide an image forming apparatus and image forming method which can obtain an optimal printing result by effecting color conversion and color correction while giving adequate consideration to a color "area" effect and effecting color conversion and color correction in a way to be matched to the kind of image decided by image information.

In one aspect of the present invention there is provided an image forming apparatus comprising an identifying section configured to analyze image information and identify object information and detect the size of the object information and concentration difference between the object information and background information; an image processing section configured to, based on at least one of the size of the object information detected by the identifying section and the concentration difference relative to the background information, perform image processing; and a printer section configured to form an image on a recording medium based on image information on which the image processing is performed by the image processing section.

The present invention provides the image forming apparatus which, by giving consideration to the size of the object information analyzed from image information represented by a page description language and the concentration difference of the object information relative to the background, can cancel a color "area" effect and make printing in a way to have a print finishing felt natural to the human eye. That is, the human eye involves the color "area" effect such that, for a smaller area portion, the lightness is felt lower in level and, for a higher lightness portion of the background, the lightness of the object is felt inadequate. By effecting the color correction in accordance with these, it is possible to obtain print finishing natural to the human eye. That is, the lightness level of the object is increased when the size of the object information is below a given size and the lightness level of the object information is increased when the background of the object information and adjacent object information is higher in lightness level. As a result, it is possible to print an image felt natural to the human eye.

In another object of the present invention there is provided an image forming apparatus comprising an identifying section configured to analyze image information and identify object information and, in addition, detect character information from the image information; a deciding section configured to decide the attribute of the object represented by the object information by effecting comparison processing on the character information detected by the identifying section with the use of database; an image processing section configured to perform image processing on the image information based on the attribute of the object represented by the object information decided by the deciding section; and a printer section configured to form an image on a recording medium based on the image information on which the image processing section is performed.

By detecting the character information in the image information represented by the page description language (PDL) and performing searching processing on the character information, for example, with the use of an initially prepared database of an initially prepared database, it is possible according to the present invention to know the attribute of an object represented by the object information. That is, if a character string representing [Mont Blanc] is detected in the PDL and it is found to belong to the keyword representing a cake, then the attribute of the object represented by the object information can be decided as being a [food]. By doing so, a color conversion table is selected so as to perform color conversion, for example, with a red system enhanced and corresponding halftone is selected to perform color conversion and tone processing. By doing so, printing processing is done with an optimal color correction made to the object information corresponding to the image represented by the [food].

BRIEF DESCRIPTION OF THE SEVERAL VIEWS OF THE DRAWING

FIG. 5 shows an object processing order table for explaining the processing of an image processing section of the image forming apparatus according to the second embodiment according to the present invention;

FIG. 6 shows a table for explaining the determining of color processing parameters in the image processing section of the image forming apparatus according to the second embodiment of the present invention;

FIG. 8 shows a keyword table for explaining the processing of the image processing section of the image forming apparatus according to the third embodiment of the present invention; and FIG. 9 shows a table for explaining the determining of a halftone and color conversion table in the image processing section of the image forming apparatus according to the third embodiment of the present invention.

DETAILED DESCRIPTION OF THE INVENTION

An image forming apparatus according to one embodiment of the present invention will be described below with reference to the accompanying drawing.

<Image Forming Apparatus According to the Present Invention>

Figure 1:
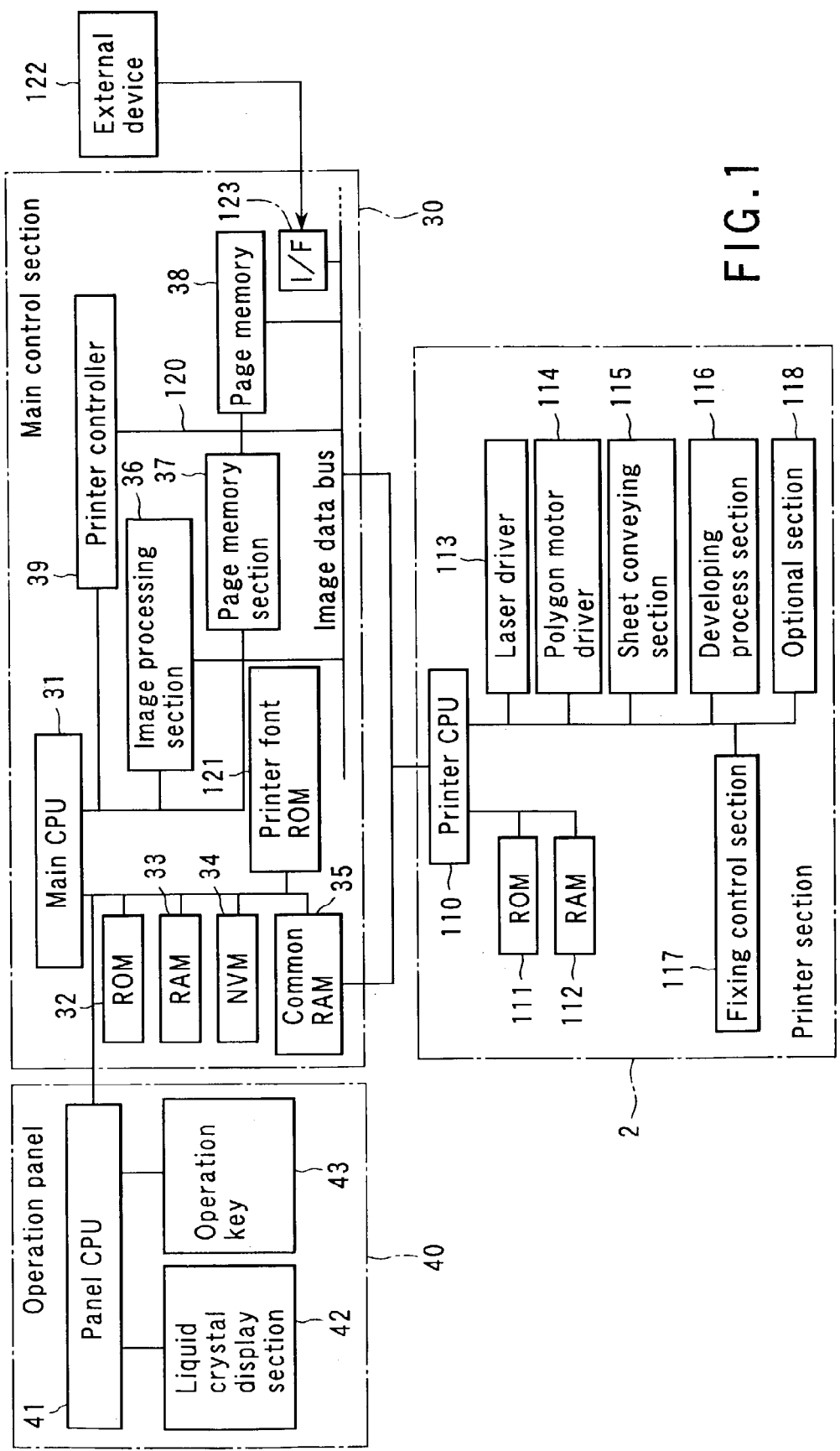
FIG. 1 is a block diagram showing one example of a structure of an image forming apparatus according to the present invention.

FIG. 1 is a block diagram schematically showing a flow of signals in the electric connections and control of a digital color printer serving as an image forming apparatus according to the present invention. In FIG. 1, the digital color printer comprises a main control section 30, an operation panel 40, and a printer section 2.

The operation panel 40 is connected to a main CPU 31 and comprises a panel CPU 41 for controlling a whole section, a liquid crystal display section 42, and operation keys 43 such as mode keys and ten keys.

The main control section 30 comprises the main CPU 31, a ROM 32, a RAM 33, an NVM 34, a common RAM 35, an image processing section 36, a page memory control section 37, a page memory 38, a printer controller 39, and a printer font ROM 121.

The main CPU 31 controls the whole of the main control section 30. The ROM 32 stores a control program and the RAM 33 temporarily stores data.

The NVM (endurance nonvolatile RAM) 34 is comprised of a nonvolatile memory backed up by a battery (not shown) and configured to retain data on the NVM 34 when a power supply is turned off.

The common RAM 35 is used to allow two-way communication to be done between the main CPU 31 and the printer CPU 110.

The page memory control section 37 allows image data to be stored into and read out of the page memory 38. The page memory 38 has an area for storing image data corresponding to a plurality of pages and allows image data, etc., which are supplied via an interface I/F 123 to be stored as compressed data on a per-page basis.

The printer font ROM 121 stores font data corresponding to print data and also stores various kinds of tables corresponding to FIGS. 6, 9 and 10 as will be described later.

The printer control 39 allows print data which comes from an external device 122, such as a personal computer, via the interface 31 to be expanded to image data with a resolution corresponding to data imparted to the print data, that is, to be so expanded with the use of font data stored into the printer font ROM 121.

The printer section 2 comprises the printer CPU 110 for controlling a whole section of the printer section 2, a ROM 111 for storing a control program, etc., a RAM 112 for data storage, a laser driver 113 for turning the light emission of a semiconductor laser on and off, a polygon motor driver 114 for controlling the rotation of a polygon motor, a paper conveying section 115 for controlling the conveyance of a sheet P by a conveyance mechanism 20, a developing process section 116 for effecting charging, developing and transferring processes with the use of chargers 62y, 62m, 62c, 62k, developing rollers 64y, 64m, 64c, 62k, and transfer units 93y, 93m, 93c, 93k, a fixing control section 117 for controlling a fixing unit 80, and an optimal section 118.

The image input interface section 123 is supplied with a color image signal from the external device 122, etc., and outputs it. The color image signal is described by a page description language (PDL) and carries a color image data.

Further, the image processing section 36, page memory 38, printer controller 39, image correction section 105 and laser driver 113 are connected by means of image data bus 120.

Figure 2:
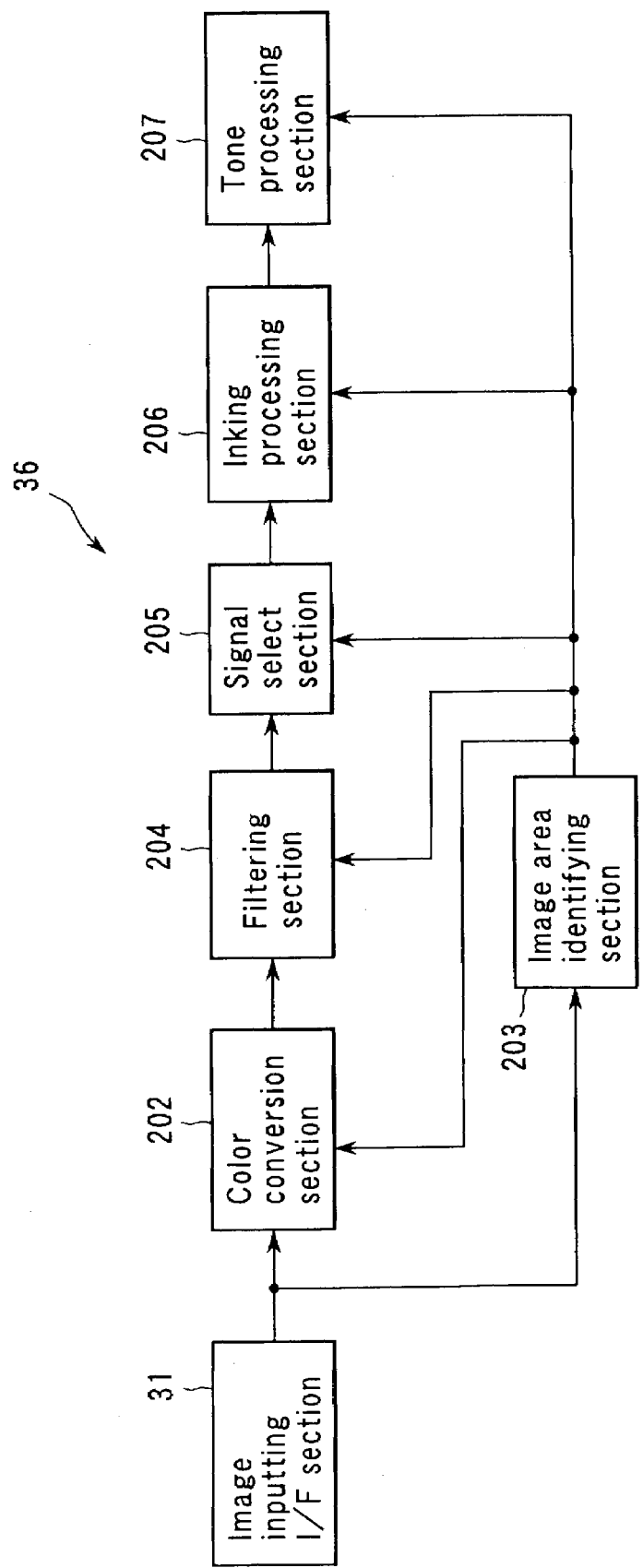
FIG. 2 is a block diagram showing one practical structure of an image processing section of an image forming apparatus according to the present invention.

FIG. 2 is an explanative view for mainly explaining the operation of the image processing section 36 of an image forming apparatus (digital color printer) having the image processing section to which the image processing according to the present invention is applied.

The image processing section 36 comprises a color conversion section 202, an image area identifying section 203, a filtering processing section 204, a signal select section 205, an inking processing section 206, and a tone processing section 207.

The color conversion section 202 allows a color image signal which represents the RGB reflectivity to be converted to a color image signal representing the concentration of coloring materials (for example, YMC) to be recorded. The relation between the RGB reflectivity and YMC concentration provides a generally complex, non-linear relation. In order to realize this conversion processing, therefore, use is made of a three-dimensional table look-up method, a one-dimensional table look-up combined 3×3 matrix method, and so on.

The image area identifying section 203 identifies, from an inputted image area signal, its pixcel attribute and outputs its result as an image area signal. Further, it detects later-described object information and size of the object information and performs comparison processing on a concentration difference of a background image and background's object information.

The filtering section 204 performs a plurality of filtering processing, such as sharpening and smoothing the YMC color image signal, in a parallel fashion. By way of example, this section performs stronger edge-enhanced processing, weaker edge-enhanced processing and smoothing filtering processing in these three ways and outputs their results, so that these outputs are selected at the signal select section 205. The filtering section 204 may receive an image area signal F and make a selective switching among a plurality of kinds of filtering processing themselves in accordance with the image area signal F. In this case, the signal select section 205 is not necessary.

The inking processing section 206 converts the filtering-processed YMC color image signal to four-color (YMCK) signals. Though a black can be represented by placing three-color (YMC) coloring materials in a registering way, four-color (YMCK) printing including a black coloring material is effected in an ordinary color printing because, in general, the black coloring material is lower in cost, higher in concentration, etc., then when the YMC colors are registered.

The tone processing section 207 is used to represent an intermediate concentration and, as one example, it may be possible to generate a pulse signal of an amplitude corresponding to the concentration signal and control a laser beam in an ON/OFF fashion in accordance with this signal.

Or by detecting character information from a PDL and retrieving this on the database as shown in a second embodiment it is possible to identify the attribute of an object representing, for example, image data of object information, determine corresponding halftone information and color conversion table information and, by effecting color correction, to obtain an optimal printing result corresponding to the attribute of the object information.

By referring to the drawing, an explanation will be made below about thus structured image forming apparatus according to first to third embodiments of the present invention.

<First Embodiment>

Figure 3:
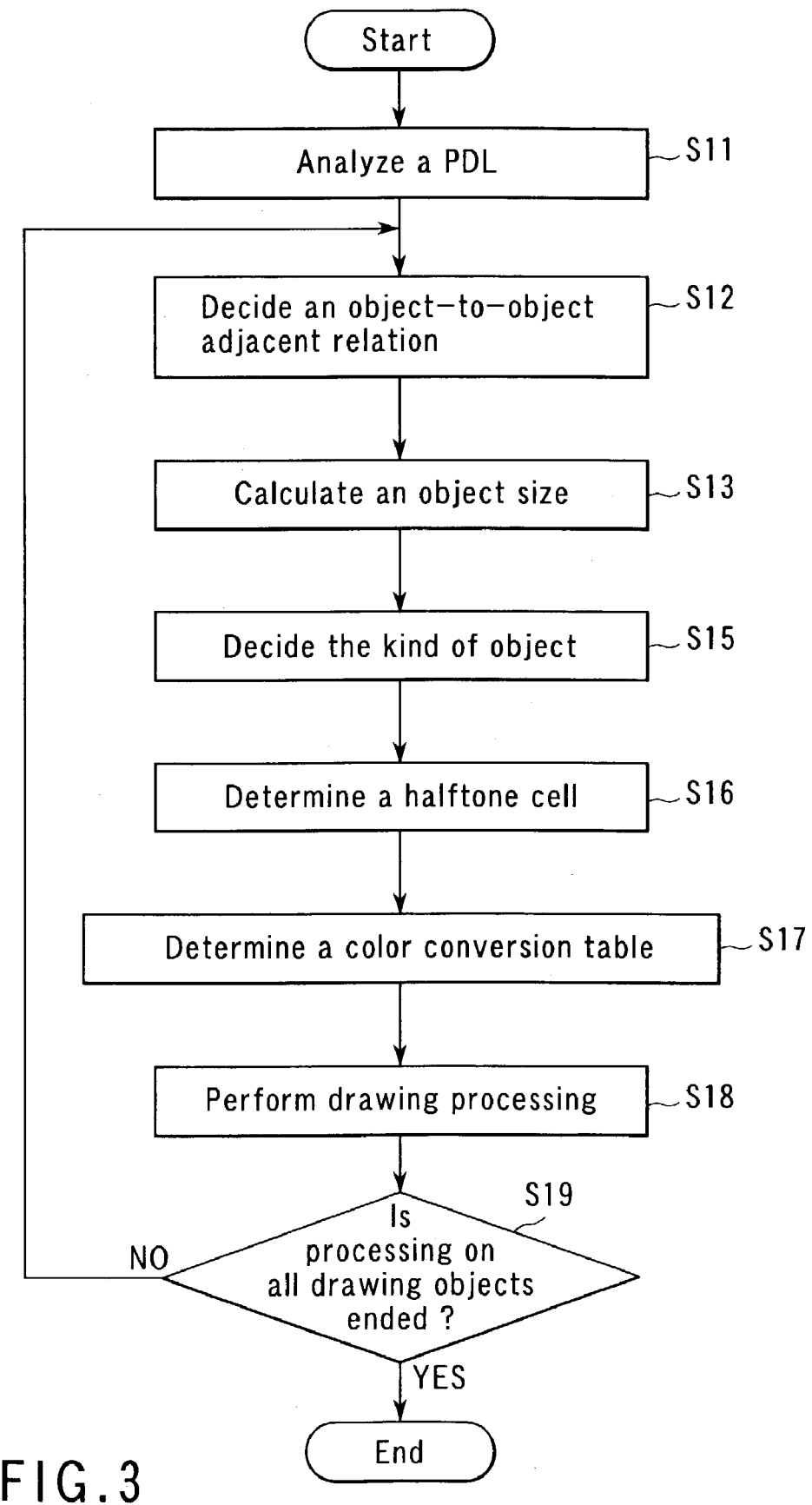
FIG. 3 is a flow chart showing the processing of an image processing section of an image forming apparatus according to a first embodiment of the present invention.

The first embodiment of the present invention provides an image forming apparatus configured to form an image in accordance with a color "area" effect by performing color correction according to the size of object information in image information and a concentration difference between the object information and a background image. FIG. 3 is a flow chart showing the processing of an image processing section of the first embodiment on the image forming apparatus of the present invention.

The first embodiment is characterized in that color conversion tables and halftone cells are switched based on the kind and size of an object involved. It is further characterized by detecting a concentration difference between the object information and its peripheral image and peripheral object and switching the color conversion tables and halftone cells. In the flow chart of FIG. 3, a PDL analysis is effected in step S11 by receiving image information which is supplied from an outer personal computer, etc., through the interface 123. Here, the PDL analysis comprises interpreting a PDL command with respect to the PDL data inputted into the image processing section 36 according to the present invention, replacing this by processing performed in the image processing section 36 according to the present invention, replacing this by processing performed in the image processing section 36 and converting the data in the PDL to a format handled in the image processing section 36. In this processing, a drawing command and its parameter in the PDL data are referred to by a subsequent processing and converted to data of a format able to generate raster data and passed onto a subsequent stage of processing.

Further, as the operation of the image area identifying section 203, the object information is detected and determination is made on an adjacency relation between the detected object information and its periphery. That is, measurement is made on a background image around the object information, a concentration difference relative to another adjacent object information and a distance between another object information in the background and object information as a target (S12). In this adjacent relation, an evaluation for the concentration difference may be done by setting one or more threshold values and evaluating their large/small size or may be done with the use of its own concentration difference.

Then the size of the object information is detected and, in more detail, the drawing size of the drawing object is calculated (S13) from a command argument and drawing parameter in the PDL. In the evaluation of this size also, it may be possible, likewise, to evaluate one or more threshold values for a size or to evaluate the size itself.

Further, determination is made on the kind of object of object information detected and the kind of object passed as a result of the PDL analyzing processing is determined by the drawing command in the PDL. By way of example, the kind of object to be decided is classified into a text, an image and graphics (S15). A value of a halftone cell on which tone processing is done by the tone processing section 207 is decided (S16) based on at least one or all of the adjacency relation between objects detected as the operation of the image area identifying section 203, the object size and the kind of object. Further, determination is made (S17) on the value of the color conversion table for performing color conversion processing in the color conversion section 202.

That is, the halftone cell determination is made by reflecting the adjacency relation between the objects, the result of the object size and the result of the kind of object involved, or made based on at least one of these. By doing so, color correction is made with a color "area" effect by the human visual sense in view. No consideration is given to the case where the lightness of the background image is 20% and that of an object information is 30%. When, however, the lightness of the background image is 80% and that of the object information is 20%, if printing is made faithfully at the lightness of 20%, human perception will be made as a darker area whose lightness is, for example, below 10%. If, in this case, printing is made with the background lightness 20%, taken into consideration, for example, with the lightness 20% corrected to 40%, etc., it is possible to obtain a printed image of a natural feeling under a human visual sense.

Further, when an object is smaller by below a given extent even in terms of the object size, a color "area" effect emerges such that the lightness is felt to be lower in level. That is, when the lightness of, for example, 20% is demanded, if printing is made directly as the 20% lightness, it will be felt as a darker area of below 10% under a human visual sense. Here, by effecting the color correction of object information of such a small area to a 40% lightness level it is possible to obtain a printed image of a natural feeling under a human visual sense.

In order to correct such a color "area" effect, the halftone cell and color conversion table are determined at steps S16 and S17. Here, the adjacency relation between objects, the result of the object size and the result of the kind of object are reflected or the determination is made based on at least one of these. In the adjacency relation between the objects it is preferable that the value be determined taking into consideration a peripheral portion, another adjacent object information and a distance relative to the background information.

Finally, in the drawing processing stage, after color conversion is made in accordance with the determined halftone cell and result of the color conversion table and the tone processing is done, the object is drawing-processed and printing raster data is prepared (S18).

The prepared printing raster data is supplied to the printer section 2 and an image is formed on a recording medium as a printing image with the above-mentioned color "area" effect taken into consideration.

<Second Embodiment>

Figure 4:
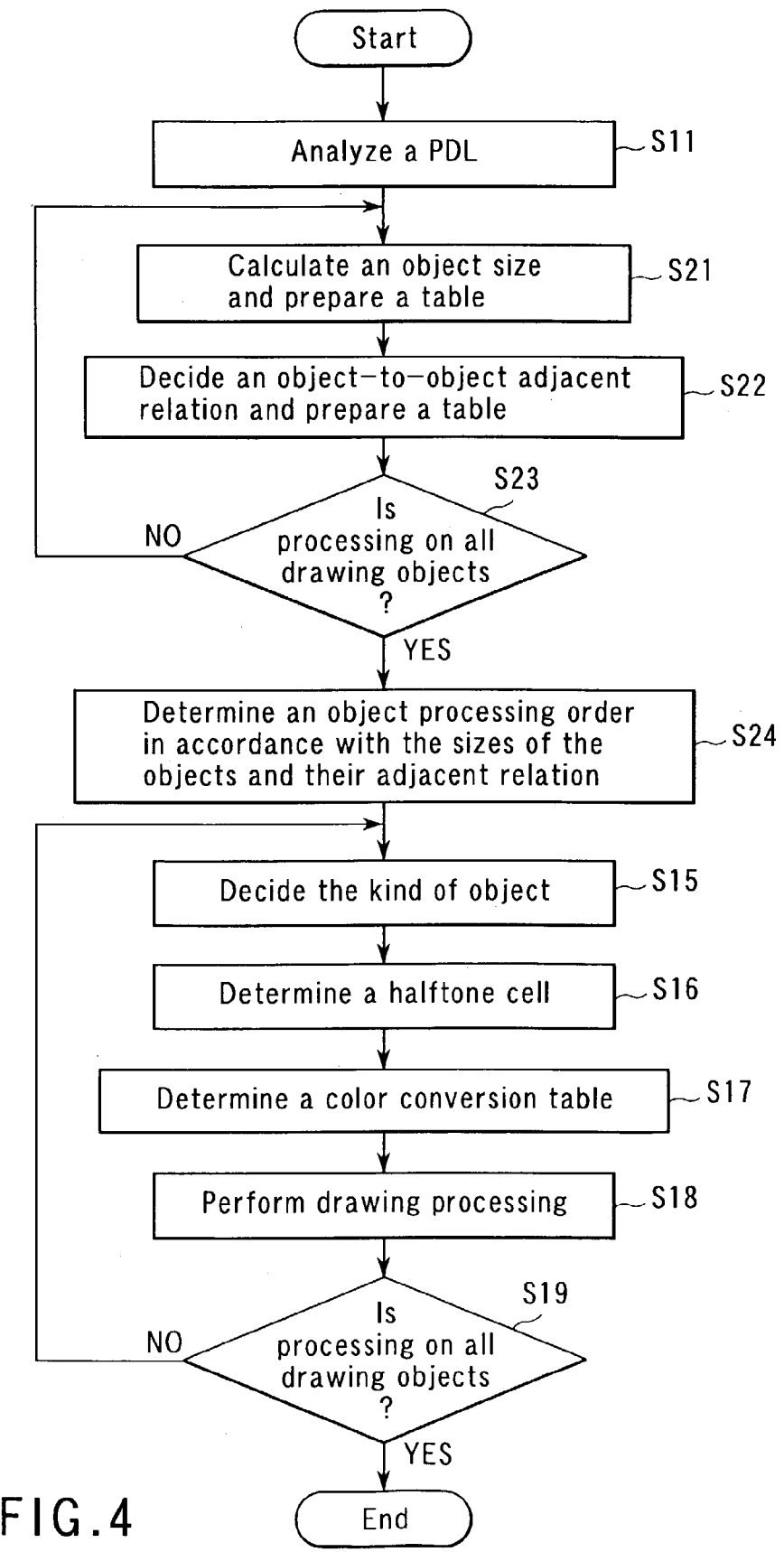
FIG. 4 is a flowchart showing the processing of an image processing section of an image forming apparatus according to a first embodiment of the present invention.

A second embodiment according to the present invention provides an image forming apparatus which shows the order of processing in the case of a plurality of object information being involved in the color correction on the first embodiment. FIG. 4 is a flow chart showing the image processing section of a second embodiment of an image forming apparatus according to the present invention. FIG. 5 shows an object processing table and FIG. 6 shows a table for explaining the determination of a color processing parameter.

In the second embodiment of the image forming apparatus according to the present invention, after in the flow chart of FIG. 4 a PDL analysis is made (S11) as in the same way as that of the first embodiment, the size of object information detected is found. The size is entered into the object processing order table as shown in FIG. 5. That is, the size of an object under an object number (1) is entered as 80 pixels into the object processing order table. Then, in the same way as in the first embodiment, determination is made on the adjacency relation of the detected object information and it is entered into the abject processing order table. That is, no adjacent object is present under the object number (1), or the adjacent object under an object number (3) corresponds to an object number (4) and object number (5), or others. These processing are performed on all drawing objects (S23).

And when these processing are done, the drawing order is determined in a size decreasing order, thus completing a table having a list of adjacent object information (S24). In accordance with the specified order on the table, decision is made on the kind of object as in the same way as in the first embodiment (S15) and determination is made on the halftone cell (S16) and then on the color conversion table (S17). Here, FIG. 6 shows a table of a kind of object under condition of selecting a color conversion table and halftone cell, an object size, an adjacent object and a corresponding relation between the correspondingly selected color conversion table and halftone cell. In this way, it is possible to initially prepare a table showing a relation between the color conversion table and the halftone cell which are selected under a select condition and, in accordance with this, to perform select determining processing. Then, on the basis of the thus select-determined color conversion table and halftone cell, drawing processing is done (S18) on a color-converted and tone-processed object and these processing are done on all drawing objects (S19).

In this way, in the second embodiment, the halftone cells and color processing tables of the objects are determined in a size processing order of the objects. It is, therefore, possible to make well-balanced color correction and to totally obtain a printed image surface of a natural feeling to which consideration is given to the color "area" effect specific to a human visual sense.

<Third Embodiment>

Figure 7:
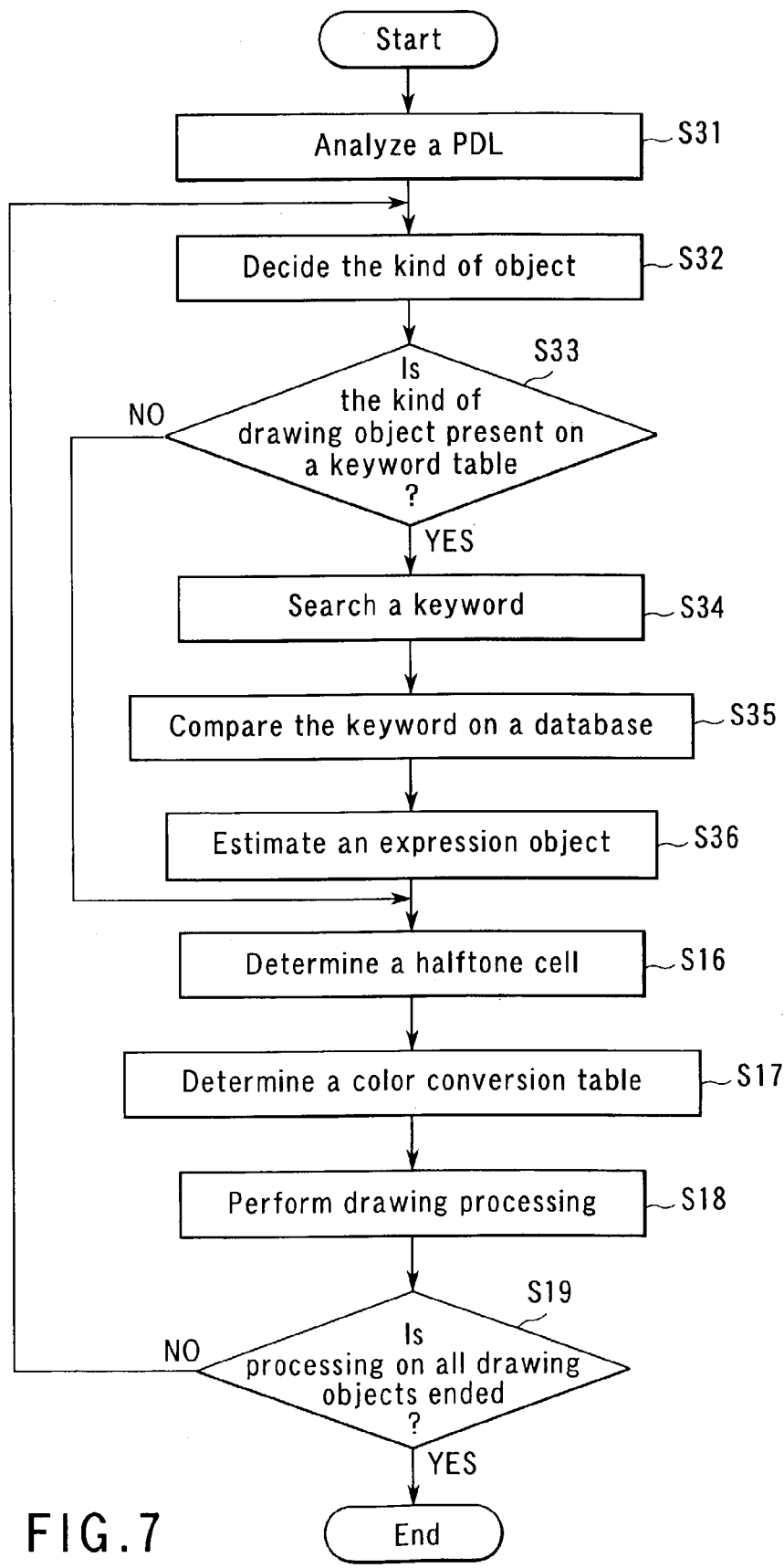
FIG. 7 shows a flow chart of the processing of an image processing section of an image forming apparatus according to a third embodiment of the present invention.

A third embodiment according to the present invention provides an image forming apparatus which can detect sentence information in a PDL, estimate the attribute of an image, based on this, represented by object information, make image correction in accordance with the attribute and obtain a printed image in a way to make use of the attribute of the image. FIG. 7 is flow chart showing the processing in an image processing section of an image forming apparatus according to the third embodiment of the present invention. FIG. 8 is a keyword table for explaining the processing in the third embodiment.

This third embodiment performs a PDF analysis (S31) as in the same way as shown in the flow char of the first embodiment of FIG. 3 and decides the kind of object (S32). After this, if the kind of drawing object is present on a keyword table of FIG. 5 (S33), a search is made for a keyword (S34). That is, in the image area identifying section 203 where a keyword search is made, a keyword registered on the keyword table as shown in FIG. 8 is searched in a targeted sentence information in the same page as that on which an object is drawn with the use of initially prepared database, etc.

In more detail, this searching processing comprises detecting character information in a page description language (PDL) in step S34 and making a search for the character information by an initially prepared database for example (S35). By doing so it is possible to know the attribute of an object represented by the object information. That is, if a character string containing [Mont Blanc] in the PDL is detected and this is understood as corresponding to a keyword called a cake through the search processing on the database, then the attribute of the object represented by the object information can be decided as being a [food] in step S36.

By doing so, as shown in FIG. 9 for example, with the use of a table containing a drawing parameter initially made to correspond to the kind and attribute, a color conversion table is selected (S17) so as to effect a red-system-enhanced color conversion and a halftone cell is selected to perform a color conversion and tone processing (S16). After optional color correction processing has been done on the object information corresponding to an [image] representing a [food]—steps S18, S19, it is possible to perform printing processing.

By detecting character information in the page description language (PDL) and making a search on a database, etc., with this character information, it is possible, in the third embodiment, to decide the attribute of a target represented by the object and, after applying a color correction to the image information in accordance with a result of decision, to form an image. Thus an image forming apparatus can be provided by which it is possible to obtain a result of better printing in accordance with the attribute such as a [food], an [animal], a [building structure] and [graphics].

Further, it may be also be possible to add estimating processing by a keyword frequency calculation and font-related calculation in the color correction processing using the estimation of the object attribute by the character information in the third embodiment. In more detail, in the flow chart shown in FIG. 7, after the search of the keyword in step S34, the counting of the frequency of the keyword involved is made in the page and the counting relating to the font involved is made. That is, in the keyword point calculation effected at the image area identifying section 203, a product of the keyword emerging frequency and keyword weight is calculated on all the object estimating keyword as a target and the total sum of such values is calculated as a result of the keyword point calculation processing. That is, the attribute estimating keyword is registered, on a per-attribute basis, in a keyword table as shown in FIG. 8 and the weight is registered together with the keyword.

Here, the font-related calculation means a calculation made on a drawing position of the keyword font in a page, kind of font and font size. And a result of calculation is quantitatively represented as a total sum and counted in as a keyword weight product. That is, the font-related calculation means the giving of the weight by, as one example, performing processing such as giving a higher estimation to a font in a position as near to the object as possible, giving a higher estimation to the kind of specific font and giving a higher estimation to a larger size font.

In this way, one keyword is registered as the estimation elements of two or more different attributes and a highest point attribute is selected from the result of the keyword point calculation processing. By referring to the table as shown in FIG. 9 according to the selected attribute, the corresponding halftone cell is selected and corresponding color conversion table is selected (S16 to S18). These processing are performed on all the objects (S19).

In this way, an image forming apparatus can be provided according to which the keyword frequency count and font-related calculation are made to allow the searching processing to be made for the character information in the PDL, the frequency calculation to be made on the keyword and the weight calculation to be made on the font and, in addition, the highly accurate estimation processing is also made on the object's attribute and hence the color correction is made in a way to be matched to the objects attribute.

As set out in more detail, according to the present invention, an image forming apparatus and method are provided according to which it is possible to obtain an optimal printing result by effecting the color conversion and tone correction, taking the color "area" effect more into consideration, and the color conversion and color correction in accordance with the object's attribute decided by the image information.

What is claimed is:

1. An image forming apparatus comprising:
   an identifying section configured to analyze image information and identify object information and to detect the size of the object information and a concentration difference between the object information and background information;
   an image processing section configured to, based on at least one of the size of the object information detected by the identifying section and the concentration difference relative to the background information, perform image processing on the image information; and
   a printer section configured to form an image on a recording medium, based on the image information which image processing is performed by the image processing section,
   wherein the image processing section has a tone processing section configured to determine halftone control information based on at least one of the size of the object information and concentration difference relative to the background information detected by the image identifying section and, by doing so, perform tone processing on the image information.

2. An image forming apparatus according to claim 1, wherein the image processing section has a color conversion section configured to determine color conversion table information based on at least one of the size of the object information and background information detected by the identifying section and, by doing so, perform color conversion processing to the image information.

3. An image forming apparatus according to claim 1, wherein the image identifying section also detects a distance relative to another object information which is the background information and the image processing section determines at least one of halftone control information and color conversion table information, based on the concentration difference relative to the background information and distance relative to said another object information and, based on this, performs image processing on the image information.

4. An image forming apparatus according to claim 1, wherein the image processing section determines, in a decreasing size order of object information detected by the identifying section, at least one of halftone control information and color conversion table information relating to a plurality of the object information and performs image processing on the image information based on at least one of the determined halftone control information and color conversion table information.

* * * * *